(12) United States Patent
Yamada et al.

(10) Patent No.: US 8,199,436 B2
(45) Date of Patent: Jun. 12, 2012

(54) MAGNETIC HEAD SLIDER HAVING ULTRA THIN BASE LAYER WITH GROUP 6B ELEMENT AND PROTECTIVE LAYER

(75) Inventors: Taiki Yamada, Hong Kong (CN); Kunihiro Ueda, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 227 days.

(21) Appl. No.: 12/654,216

(22) Filed: Dec. 14, 2009

(65) Prior Publication Data

US 2010/0302685 A1    Dec. 2, 2010

Related U.S. Application Data

(63) Continuation-in-part of application No. 12/457,003, filed on May 28, 2009, now abandoned.

(51) Int. Cl.
*G11B 5/60* (2006.01)
(52) U.S. Cl. .................................................. 360/235.1
(58) Field of Classification Search ..... 360/235.1–235.3
See application file for complete search history.

(56) References Cited

U.S. PATENT DOCUMENTS

| | | | | |
|---|---|---|---|---|
| 4,709,284 A | * | 11/1987 | Endo et al. | 360/235.3 |
| 5,159,508 A | * | 10/1992 | Grill et al. | 360/235.2 |
| 6,567,241 B2 | * | 5/2003 | Brand | 360/235.1 |
| 7,382,573 B2 | | 6/2008 | Carey et al. | |

FOREIGN PATENT DOCUMENTS

JP    6-12615    1/1994

OTHER PUBLICATIONS

Sep. 19, 2011 Office Action from U.S. Appl. No. 12/457,003.

\* cited by examiner

*Primary Examiner* — Allen Heinz
(74) *Attorney, Agent, or Firm* — Nixon & Vanderhye PC

(57) ABSTRACT

A magnetic head slider according to the present invention comprises: a slider body including either a write head element or a read head element or both the write head element and the read head element; a seed layer provided on an air bearing surface of the slider body, the seed layer covering either the write head element or the read head element or both the write head element and the read head element, the seed layer having a film thickness that is less than 1 nm; and a protective film formed of diamond-like carbon, the protective film covering the seed layer. The seed layer is mainly formed of silicon and contains a 6A group element in a proportion of 2 atomic % or more and 30 atomic % or less.

7 Claims, 5 Drawing Sheets

MAGNETIC HEAD SLIDER HAVING ULTRA THIN BASE LAYER WITH GROUP 6B ELEMENT AND PROTECTIVE LAYER

This application is a continuation-in-part of U.S. application Ser. No. 12/457,003, filed May 28, 2009, now abandonded, the entire content of which is hereby incorporated by reference herein.

BACKGROUND OF THE INVENTION

1. Field of the Invention

The present invention relates to a magnetic head slider, and more particularly to the construction of a protective film and a seed layer for the protective film formed on an air bearing surface.

2. Description of the Related Art

In a hard disk drive (HDD), data are read from a recording medium (a hard disk or a magnetic disk) and are written to a recording medium while a magnetic head slider (hereinafter referred to as a slider) glides over the recording medium with a small gap.

A slider that reads data from the recording medium and that writes data to the recording medium is required to be free from corrosion in various environmental conditions, and is also required to be protected from collision against the recording medium. For this purpose, a protective film formed of diamond-like carbon (DLC) is formed on a surface of a slider body that is opposite to the recording medium, i.e., the air bearing surface. In order to improve adhesion of the protective film to the slider body, a seed layer, for example formed of silicon, is formed between the protective film and the slider body. In this specification, the slider body refers to the portion of the slider that does not include the seed layer and the protective film, i.e., the portion of the slider that includes a substrate thereof and elements, such as a write head element, a read head element and insulating layers, formed on the substrate in the wafer process.

As a result of the recent increase in recording density of recording media, a further reduction in the distance between the slider and the recording medium has been required. More precisely, this means a reduction in the distance between the read head element and the recording medium and in the distance between the write head element and the recording medium. Therefore, an increase in the recording density requires reducing the flying height, as well as reducing the thicknesses of the protective film and the seed layer. The reduction in the flying height has progressed over long years based on the method called the dynamic flying height. On the other hand, since the protective film and the seed layer are formed on the surface of the slider body which is made irregular because of lapping etc, the film thicknesses of the protective film and the seed layer can be easily affected and may be made uneven due to the irregularities. Portions of the protective film having thinner film thicknesses may easily develop pin holes which may cause corrosion in the read head element and the write head element lying below the pin holes. Therefore, it is difficult to simply reduce the film thicknesses of the protective film and the seed layer in order to reduce the distance between the slider and the recording medium.

Japanese Patent Publication No. 1994-12615 discloses a magnetic head having a protective film, such as a DLC film, and a seed layer under the protective film, the seed layer comprising one or more elements selected from a group consisting of silicon, chromium etc. The art disclosed in this document aims at improving adhesion of the protective film to the slider body by means of such a seed layer. Since corrosion also occurs as a result of separation of the seed layer from the slider body, followed by exposure of the slider body, an improvement in adhesion of the seed layer contributes to an improvement in robustness against corrosion. The above-mentioned document also discloses that the seed layer and the protective film each preferably have a thickness of 1 to 5 nm.

Thus, from the viewpoint of securing robustness against corrosion, the lower limit of the film thickness of the seed layer and the protective film is about 1 nm according to the prior art and accordingly, the lower limit of the total thickness of the seed layer and the protective film is about 2 nm. Therefore, limiting the total thickness of the seed layer and the protective film may limit an increase in the recording density when developing a magnetic head slider capable of coping with further increases in the recording density.

SUMMARY OF THE INVENTION

In view of the above-described circumstances, an object of the present invention is to provide a magnetic head slider that is capable of reducing the total film thickness of the seed layer and the protective film while securing robustness against corrosion.

A magnetic head slider according to the present invention comprises: a slider body including either a write head element or a read head element or both the write head element and the read head element; a seed layer provided on an air bearing surface of the slider body, the seed layer covering either the write head element or the read head element or both the write head element and the read head element, the seed layer having a film thickness that is less than 1 nm; and a protective film formed of diamond-like carbon, the protective film covering the seed layer. The seed layer is mainly formed of silicon and contains a 6A group element in a proportion of 2 atomic % or more and 30 atomic % or less.

Pin holes are generated and develop with time due to corrosion even if they are not formed at the time of forming the seed layer and the protective film. Corrosion becomes a problem only when the pin holes penetrate through the protective film, as well as the seed layer, to reach the write head element and the read head element. Therefore, even if pin holes are formed in the protective film, there is no substantial problem when forming of the pin holes stops in the seed layer. Because of the effect of the 6A group element in improving robustness against corrosion of the seed layer that is mainly formed of silicon, pin holes which may reach the write head element and the read head element are less apt to occur even if the film thickness of the seed layer is reduced. This effect can be obtained by including at least 2 atomic % of the 6A group element in the seed layer. However, since the seed layer also functions as a bonding layer for the protective film, too high proportion of the 6A group element may decrease the adhesive property of the seed layer. The desired adhesive property of the seed layer can be ensured by setting the concentration of the 6A group element at 30 atomic % or less.

By the way, the seed layer is ordinarily subject to film stress caused by the wedge effect that is produced in the seed layer at the time of film formation. "The wedge effect" refers to a phenomenon, in which when a thin film is formed, particles (ions, atoms or clusters) that form the thin film are spattered toward a substrate (a slider body) and are then driven into and deposited on the substrate. Due to the wedge effect, stress remains in the thin film that is formed. The film stress tends to separate the seed layer from the slider body and actually separates the seed layer depending on the balance between the adhesive force and the separating force that are both caused between the seed layer and the slider body. Since the film stress is proportional to the film thickness, separation of the seed layer can occur more easily when the film thickness of the seed layer is increased. Separation of the seed layer exposes the slider body at the location where the separation occurs and may cause corrosion of the write head element or the read head element if they exist at the location. Adhesive property of the seed layer can be ensured to some extent by setting the concentration of the 6A group element at 30 atomic % or less. However, even in this case, if the film thickness is too large, then the separating force caused by the film stress may be larger than the adhesive force and separation may occur easily. It is therefore necessary to adjust both the concentration of the 6A group element and the film thickness of the seed layer in order to prevent corrosion. By setting the concentration of the 6A group element at 30 atomic % or less and by setting the film thickness of the seed layer at less than 1 nm, desired adhesive property of the seed layer can be achieved and film stress can be limited within a suitable range. Thus, corrosion resulting from separation of the seed layer can be simultaneously prevented. The reason why a film thickness of less than 1 nm can be achieved while preventing the formation of pin holes is that the concentration of the 6A group element is set at 2 atomic % or more to improve robustness against corrosion of the seed layer. The film thickness of the seed layer that is less than 1 nm is not only an effect of the present invention but also a requirement for solving the problem. Thus, the concentration of the 6A group element and the film thickness of the seed layer are related to each other, and both a reduction in film thickness and prevention of corrosion can be simultaneously achieved only when all of these requirements are satisfied.

The above-described and other objects, features and advantages of the present invention will become apparent from the following detailed description with reference to the accompanying drawings illustrating the present application.

DETAILED DESCRIPTION OF THE PREFERRED EMBODIMENT

Figure 1:
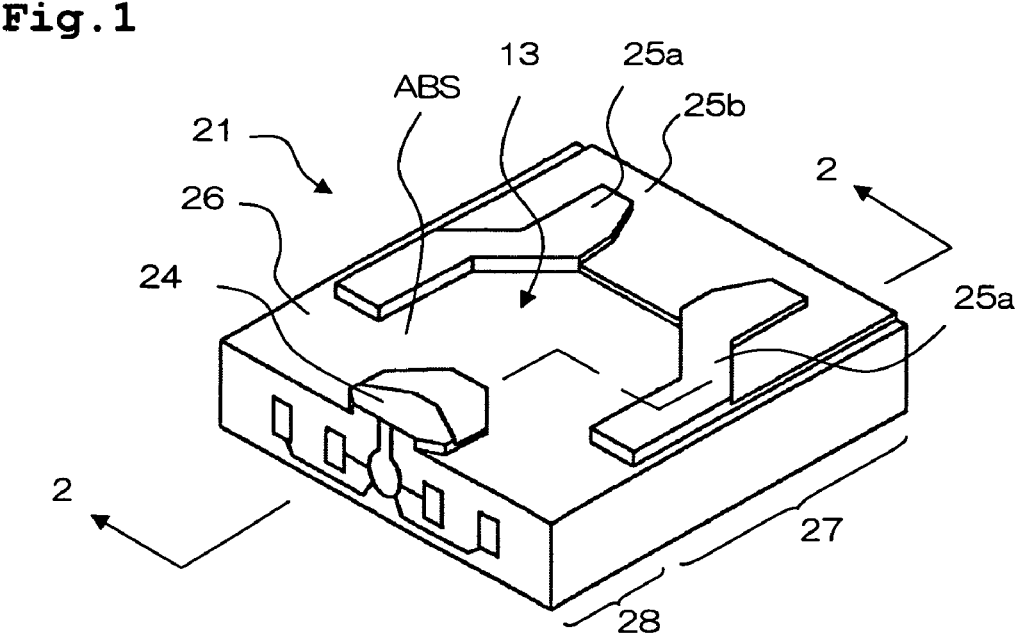
FIG. 1 is a perspective view of a slider according to an embodiment of the present invention.
Figure 1:
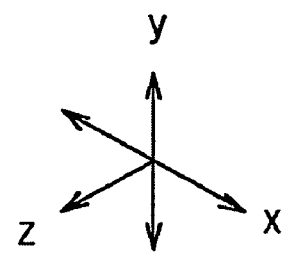
Figure 2:
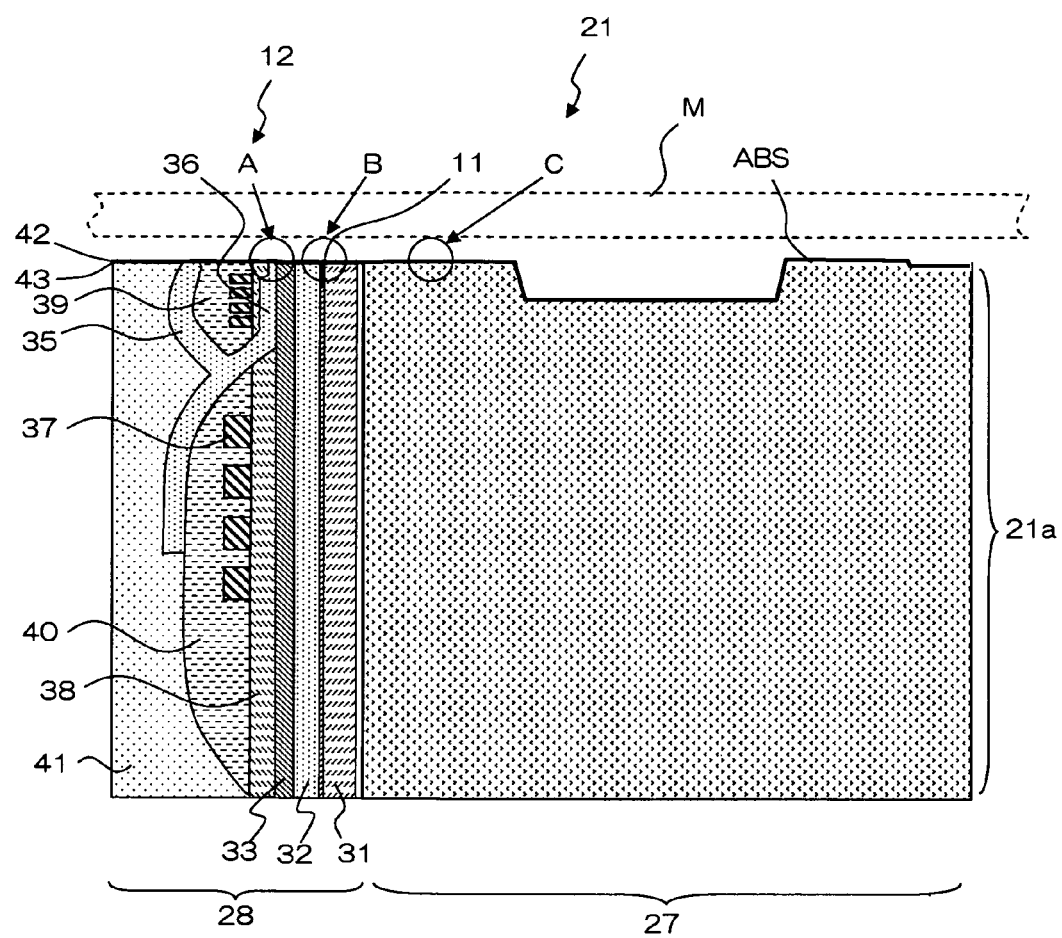
FIG. 2 is a sectional view of the slider shown in FIG. 1, taken along line 2-2 in FIG. 1.
Figure 3A:
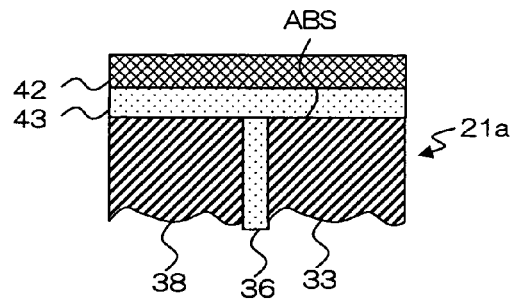
FIGS. 3A to 3C are partial sectional views of the slider in the vicinity of the protective film.
Figure 3B:
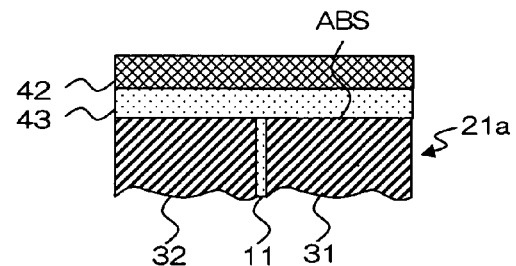
Figure 3C:
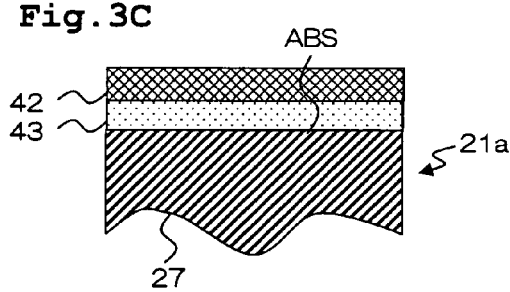

A slider to which the present invention is applied will be described with reference to the drawings. FIG. 1 is a perspective view of an example of a slider according to the present invention. FIG. 2 is a sectional view of the slider shown in FIG. 1, taken along line 2-2 in FIG. 1. FIGS. 3A to 3C are enlarged detailed views of a portion of a seed layer and a protective film, i.e., the portions A to C shown in FIG. 2, respectively. For descriptive purpose, in the following description, "slider 21" includes a seed layer and a protective film described later, and "slider body 21a" refers to a portion of slider 21 that does not include the seed layer and the protective film.

Referring to FIG. 1, a rotatably driven recording medium in the form of a disk, not shown, is positioned above slider 21. Slider 21 has substrate 27 and thin-film magnetic head portion 28. Slider 21 has a generally hexahedral shape and one of six surfaces of slider 21 is configured to be opposite to the recording medium. In this specification, air bearing surface ABS is defined as a surface of slider body 21a that is opposite to the recording medium, as shown in FIGS. 3A to 3C. In other words, air bearing surface ABS is a surface of slider body 21a, the surface being opposite to the recording medium via seed layer 42 and protective film 43. Slider body 21a has, on air bearing surface ABS, recessed and projecting portions 13 (a floating surface) that control the floating characteristics of slider 21. The projecting portions consist of read/write portion 24, in which read head element 11 and write head element 12 (see FIG. 2) of thin-film magnetic head portion 28 are formed, and rail portions 25a, 25b having a stepped portion. The other portion is recessed portion 26.

Referring to FIG. 2, recording medium M extends in a plane perpendicular to the drawing above air bearing surface ABS in the figure. Thin-film magnetic head portion 28 has read head element 11 for reading magnetic information from recording medium M and write head element 12, including an induction-type magnetic conversion element, for writing magnetic information to recording medium M. However, thin-film magnetic head portion 28 may only have read head element 11 or may only have write head element 12. Recording element 12 may be of a horizontal recording type for writing information in an in-plane direction of recording medium M or may be of a perpendicular recording type for writing information in an out-of-plane direction of recording medium M.

Thin-film magnetic head portion 28 has substrate 27, shown on the right side of the figure, that is made of a ceramic material, such as AlTiC ($Al_2O_3.TiC$), and layers that are successively stacked leftward in the figure. On substrate 27 (on the left side of substrate 27 in the figure, ditto), lower shielding layer 31, for example, made of perm-alloy (NiFe), is formed via an insulating layer. Read head element 11 is provided on lower shielding layer 31, facing air bearing surface ABS. Read head element 11 may be any element using a magnetically sensitive film that exhibits a magnetoresistive effect, such as a GMR (giant magnetoresistance) element, a TMR (tunneling magnetoresistive effect) element or a CPP GMR (current-perpendicular-to-plane giant magnetoresistive effect). Read head element 11 is connected to a pair of lead layers, not shown, that supplies sense current.

Write head element 12 is formed above read head element 11 via upper shield layer 32 and insulating layer 33. Write head element 12 has an arrangement for so-called perpendicular magnetic recording. Magnetic pole layers for writing have main magnetic pole layer 36 and magnetic shield layer 35. These magnetic pole and shield layers 35, 36 are formed by frame plating or the like. Main magnetic pole layer 36, which is made of FeCo, is exposed on air bearing surface ABS substantially perpendicularly thereto. Coil layer 37, which extends above gap layer 38 made of insulating material, is wound around main magnetic pole layer 36 in order to induce a magnetic flux within main magnetic pole layer 36. Coil layer 37 is formed by means of frame plating or the like. The magnetic flux is guided inside main magnetic pole layer 36 and is emitted from air bearing surface ABS toward the recording medium. The dimension of main magnetic pole layer 36 is reduced not only in the stacking direction of the element but also in the track width direction (the direction that is perpendicular to the drawing of FIG. 2) in the vicinity of air bearing surface ABS, thereby producing a concentrated and intense writing magnetic field that realizes high recording density.

The magnetic shield layer 35 is a magnetic layer that is magnetically coupled to main magnetic pole layer 36. The magnetic shield layer 35 has a thickness of about 0.1 to about 5 μm and is made of an alloy that consists of any two of Ni, Fe, and Co or three thereof. The magnetic shield layer 35 branches from main magnetic pole layer 36 so that it is located opposite to main magnetic pole layer 36 via gap layer 38 and coil insulating layer 39 at air bearing surface ABS. The magnetic shield layer 35 has a trailing shield portion having a wider layer section than the rest of the magnetic shield layer 35 at the end portion that is on the side of air bearing surface ABS. The magnetic shield layer 35 having such an arrangement provides a steeper magnetic field gradient between the magnetic shield layer 35 and main magnetic pole layer 36 in the vicinity of air bearing surface ABS. As a result, it is possible to reduce signal output jitter, to thereby lower the error rate when in the reading mode. Write head element 12 is covered with overcoat layer 41 made of insulating material, such as $Al_2O_3$.

Referring to FIGS. 3A to 3C, seed layer 43 having a film thickness of less than 1 nm and protective film 42 covering seed layer 43 and having a film thickness of less than 1 nm are provided on air bearing surface ABS of slider body 21a. The surface of slider 21 that is actually opposite to the recording medium is the surface of protective film 42. The main role of seed layer 43 resides in improving adhesion between slider body 21a and protective film 42. Base layer 43 and protective film 42 cover the entire surface of air bearing surface ABS, and therefore, they cover not only substrate 27 but also write head element 12 (main magnetic pole layer 36 and the magnetic shield layer 35, not shown) and read head element 11, as shown in FIGS. 3A to 3C. If the slider is only provided with the write head element or with the read head element, the write head element or the read head element that is provided, as well as the substrate, is covered.

Base layer 43 is mainly made of silicon (Si) and contains chromium (Cr) as an additive. In other words, seed layer 43 is formed of SiCr. The proportion of chromium is preferably equal to or higher than 2 atomic % and equal to or lower than 30 atomic %. More desirably, the proportion of chromium is equal to or higher than 4 atomic % and equal to or lower than 20 atomic %. The component of seed layer 43 may also be selected from the 6A group elements other than chromium, such as molybdenum (Mo) and tungsten (W) and one or more elements included in the 6A group may be added to silicon. Protective film 42 is formed of diamond-like carbon (DLC).

By the way, protective film is provided for the purpose of protecting the write head element and the read head element from a severe environment. More specifically, protective film is required to prevent corrosion of the write head element and the read head element in an HDD that is required to operate continuously for a long time and to maintain the characteristics of the write head element and the read head element even in a high-temperature and high-humidity environment. The difficulty in meeting these requirements increases with a reduction in the thicknesses of the protective film and the seed layer, and about 1 nm is the lower limit of the film thicknesses of the seed layer and the protective film.

In the present embodiment, prevention of corrosion is achieved by enhancing robustness of seed layer 43 against corrosion. The 6A group elements including chromium are effective in improving robustness against corrosion, and robustness of seed layer 43 against corrosion is improved by adding a 6A group element to seed layer 43 that is mainly formed of silicon. Because of the fine irregularities on the air bearing surface ABS of slider body 21a caused by lapping, seed layer 43 is considered to be uneven and the film thickness of seed layer 43 is considered to be reduced at some locations. However, corrosion is less apt to occur on the air bearing surface of slider body 21a due to the improvement in robustness of seed layer 43 itself against corrosion. If the concentration of chromium is lower than 2 atomic %, then large improvement in robustness against corrosion cannot be expected and if the concentration of chromium exceeds 30 atomic %, then the adhesion of seed layer 43 is deteriorated.

Separation of seed layer 43 from slider body 21a makes the separated portion more susceptible to the external environment. Therefore, corrosion may also occur because of separation of seed layer 43. Separation is closely related with film stress in seed layer 43. An increase in the thickness of seed layer 43 increases film stress and causes separation more easily. Since chromium is a metal, chromium is expected to improve the adhesion to the metal layer that is to be protected. Therefore, seed layer 43 has desired adhesion even if it has a thinner thickness, and can be formed in a thinner thickness because of the protective effect of chromium. From the viewpoint of ensuring the desired characteristics, the film thickness of seed layer 43 should be thinner than a certain value. More specifically, the thickness of seed layer 43 is preferably set at less than 1 nm and more preferably set at 0.9 nm or less.

It should be noted that separation of seed layer 43 can be prevented by the synergetic effect of setting the concentration of chromium in seed layer 43 within a suitable numeric value range and by setting the film thickness of seed layer 43 within a suitable numeric value range. If the concentration of chromium exceeds 30 atomic %, then separation cannot be sufficiently prevented even if the film thickness is set at less than 1 nm to limit the film stress, because the adhesion of seed layer 43 itself is reduced and accordingly robustness against corrosion in an acidic atmosphere is deteriorated. On the other hand, if the film thickness is 1 nm or more, then film stress is too large to sufficiently prevent separation even if the concentration of chromium is limited to 30 atomic % or less. By setting the film thickness at less than 1 nm and by setting the concentration of chromium at 30 atomic % or less, the desired adhesion can be secured; the separating force caused by the film stress can be limited; and thereby separation can be prevented. Also, the reason why the film thickness of seed layer 43 can be set at less than 1 nm while preventing the formation of pin holes is that robustness of seed layer 43 against corrosion is improved by setting the concentration of chromium at 2 atomic % or higher. The upper and lower limits of the concentration of chromium in seed layer 43 and the film thickness of seed layer 43 are strongly related with each other, making it possible to reduce the film thickness of seed layer 43 and to secure robustness against corrosion.

It is thought that influences on the elements in a high-temperature and high-humidity environment are caused by separation of seed layer 43 from slider body 21a. Therefore, influences on the elements in a high-temperature and high-humidity environment can be minimized by setting the upper and lower limits of the concentration of chromium in seed layer 43 and the film thickness of seed layer 43 as described above.

The above-described slider can be manufactured according to the steps described below.

First, a number of read head elements and write head elements are stacked on a wafer, made of AlTiC, in the thin-film process. Next, the wafer is diced into row bars that are in a form of strips. Subsequently, the surface of each row bar that is to be opposite a recording medium is lapped so that air bearing surface ABS is formed. The lapping mainly aims at setting the resistance value of read head element 11 at a desired value, but write head element 12 is simultaneously lapped and the height of recording gap 34 (the length in the direction perpendicular to air bearing surface ABS) is adjusted to a desired value. Thereafter, fine lapping is preferably performed in order to finish the surface.

Next, surface cleaning of air bearing surface ABS and PTR (Pole Tip Recession) control are performed by means of sputter etching or IBE (Ion Beam Etching). In the PTR control, Ar gas or a mixture of Ar gas and an additive gas, such as oxygen or nitrogen, is ordinarily used, and RF is used for glow discharge.

Next, seed layer 43 is formed on air bearing surface ABS. Sputtering, IBD or the like is used for deposition of seed layer 43.

Next, protective film 42, made of DLC, is formed on seed layer 43. When sputtering is used, silicon and chromium may be simultaneously sputtered by placing a small piece of chromium on a silicon monocrystalline target or by using a mixture or an alloy of silicon and chromium as a target. Magnetron sputtering is ordinarily used for sputtering. Protective film 42 can be formed by means of ECR (Electron Cyclotron Resonance), IBD (Ion Beam Deposition), CVD (Chemical Vapor Deposition), FCVA (Filtered Cathodic Vacuum Arc), sputtering or the like. Thereafter, the row bar is diced and the slider is completed through conventional processes, such as cleaning and inspection.

Figure 4:
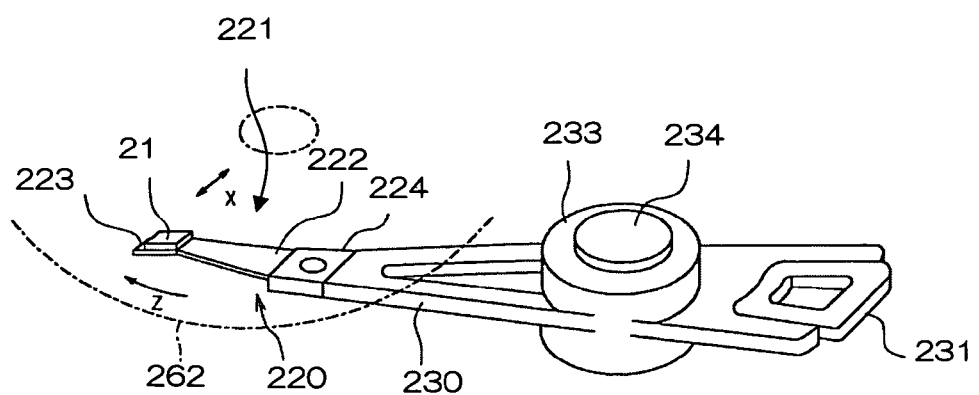
FIG. 4 is a perspective view of a head arm assembly that includes a head gimbal assembly, the head gimbal assembly incorporating the slider of the present invention.

A head gimbal assembly incorporating the above-described slider will be described with reference to FIG. 4. Referring to FIG. 4, head gimbal assembly 220 has slider 21 and suspension 221 for elastically supporting slider 21. Suspension 221 has load beam 222 in the form of a plate spring formed of stainless steel, flexure 223 provided on one end of load beam 222 and base plate 224 provided on the other end of load beam 222. Slider 21 is joined to flexure 223 so that a suitable degree of freedom is given to slider 21. A gimbal portion for keeping the orientation of slider 21 constant is provided on the portion of flexure 223 to which slider 21 is attached.

A combination of head gimbal assembly 220 and arm 230 on which head gimbal assembly 220 is mounted is called a head arm assembly. Arm 230 moves slider 21 in the track traversing direction x of hard disk 262. Arm 230 is attached to base plate 224 at one end of arm 230. Coil 231, which is a part of a voice coil motor, is attached to the other end of arm 230. Bearing portion 233 is provided on the intermediate portion of arm 230. Arm 230 is rotatably supported on shaft 234 that is attached to bearing portion 233. Arm 230 and the voice coil motor that drives arm 230 constitute an actuator.

Figure 5:
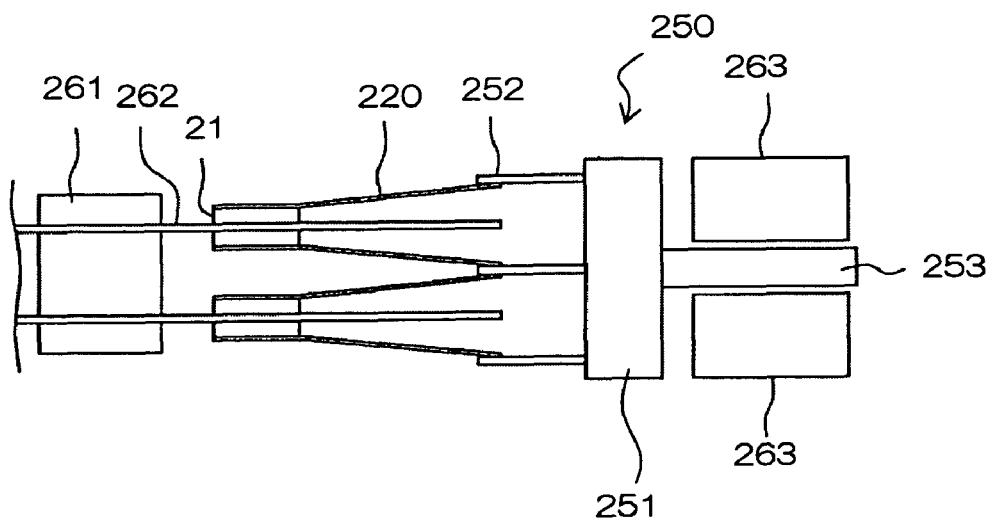
FIG. 5 is a side view of a head arm assembly that incorporates the slider of the present invention.
Figure 6:
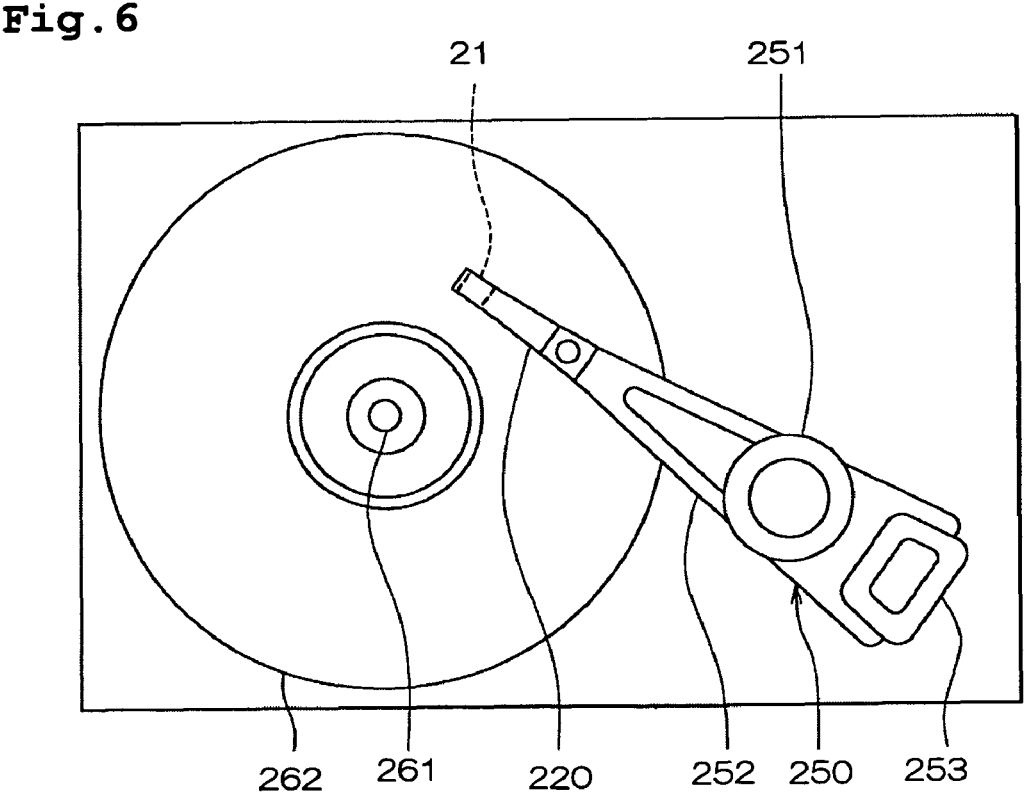
FIG. 6 is a plan view of a hard disk drive that incorporates the slider of the present invention.

A head stack assembly and a hard disk drive, both incorporating the above-described slider, will be described with reference to FIGS. 5 and 6. A head stack assembly is an element in which head gimbal assembly 220 is attached to each of a plurality of arms of a carriage. FIG. 5 is a side view of a head stack assembly. FIG. 6 is a plan view of a hard disk drive. Head stack assembly 250 has carriage 251 having a plurality of arms 252. Head gimbal assemblies 220 are attached to arms 252 so as to be arranged in a vertical direction while being spaced apart from each other. Coil 253 which is a part of a voice coil motor is attached to carriage 251 on the side of carriage 251 that is opposite to arm 252. The voice coil motor has permanent magnets 263 disposed at such positions as to face each other with coil 253 interposed therebetween.

Referring to FIG. 6, head stack assembly 250 is incorporated in the hard disk drive. The hard disk drive has a plurality of hard disks 262 attached to spindle motor 261. On each hard disk 262, two sliders 21 are disposed such that they face each other with hard disk 262 interposed therebetween. The portions of head stack assembly 250 other than sliders 21 and the actuator, which correspond to the positioning device in the present invention, support sliders 21 and position sliders 21 with respect to hard disk 262. Sliders 21 are moved in the track traversing direction of hard disk 262 by the actuator so that they are positioned with respect to hard disk 262. Write head element 12 included in slider 21 records information on hard disk 262, and read head element 11 reproduces information recorded in hard disk 262.

EXAMPLES

In the examples described below, the advantages of the present invention were confirmed by changing the composition and the film thickness of the seed layer and the film thickness of the protective film as parameters, and a suitable numeric range of each parameter was examined. Multi Deposition System MR3, a product from Shimadzu Corporation, was used to form the seed layer and the protective film. The system is capable of performing IBE, sputtering and FCVA.

First, the surface of the lapped row bar was etched by means of IBE so that the PTR was adjusted into a desired shape. Adjustment of the PTR was performed by controlling, for example, the angle and power of ion beam. Next, the seed layer was formed by using a target of Si or the like. A predetermined amount of Ar gas was introduced into the sputtering chamber, and RF or pulsating DC was applied to cause discharge, thereby the seed layer having a desired thickness was formed. Thereafter, the protective film made of DLC was formed by means of FCVA. The film thickness of the protective film was controlled by counting the amount of carbon ions by means of a Faraday cup.

Next, a sulfuric acid dipping test and a high-temperature and high-humidity atmosphere test were performed on row bars. The sulfuric acid dipping test is a test for checking the protective effect of the protective film, i.e., a test that inspects for pin holes by dipping a row bar in aqueous solution of sulfuric acid and by inspecting for corrosion. More specifically, row bars were dipped in aqueous solution of sulfuric acid with pH4 for 5 hours and were thereafter rinsed with pure water. The number of corroded sliders was then counted by means of a 2000× optical microscope in order to calculate the percent defective. The high-temperature and high-humidity atmosphere test is a test for checking how the characteristics are degraded after conserving row bars in a high-temperature and high-humidity atmosphere for a long time. More specifically, row bars were conserved for 100 hours in a high-temperature and high-humidity atmosphere of 85° C. and 85% R (relative humidity). The resistance value was measured by means of a QST (Quasi Static Test) tester before and after conserving the row bars, and the rate of change in the resistance value was calculated by the formula (resistance value before conservation−resistance value after conservation)/(resistance value before conservation)×100. The percent defective was calculated on the assumption that sliders whose resistance was changed by 5% or more have defects.

In the case of a seed layer and a protective film having a total thickness of 2 nm or more, if no defects were found in the sulfuric acid dipping test, then no defects were substantially found in the high-temperature and high-humidity environment test. In other words, the need to perform a high-temperature and high-humidity environment test was small as long as the sulfuric acid dipping test was performed. However, there is the possibility that thin films having a thickness of less than 2 nm show bad protective characteristics in a high-temperature and high-humidity environment even if the rate of occurrence of pin holes is low. Therefore, high-temperature and high-humidity environment tests were also performed in this example.

Table 1 show a test matrix and test results. The atomic precentage of chromium was changed from 0% to 35%. When Mo and W were used as an additive to silicon, the atomic percentage of Mo and W was set at 4%. The film thickness of the seed layer was changed from 0.5 nm to 1.0 nm and the film thickness of the protective film was also changed from 0.5 nm to 1.0 nm.

The concentration of chromium was calculated by means of the ESCA (Electron Spectroscopy for Chemical Analysis). $Al_2O_3$ which is the material of the overcoat layer was used as a calibration standard. The measurement range for $Al_2O_3$ was set at 75.3 eV±10 eV. A baseline was obtained from the spectrum of $Al_2O_3$, and peaks were integrated. CPS (Counts per Second) values were obtained for each step and were added to obtain a peak intensity of $Al_2O_3$. Next, a peak of Si was measured in a measurement range of 99.1 eV±10 eV in the same way as in the case of $Al_2O_3$ to obtain a peak intensity. Further, the same measurement was performed on Cr in a measurement range of 573 eV±10 eV in order to obtain a peak intensity. The peak intensity obtained was multiplied by the sensitivity value specific to each element in order to obtain an actual intensity. Initialization was performed by referring to the peak position and intensity of $Al_2O_3$.

respectively, exhibit good results on the same level or more as compared to corresponding case 6.

TABLE 1

| Test No. | Atomic Fraction of Cr (%) | Film Thickness of Base layer (nm) | Film Thickness of Protective layer (nm) | Total Thickness (nm) | Sulfuric acid dipping test percentage defective(%) | High-temperature high-humidity environment test percentage defective(%) | Notes |
|---|---|---|---|---|---|---|---|
| 1 | 0 | 0.5 | 0.8 | 1.3 | 100 | 100 | Comparative Example |
| 2 | 0 | 0.7 | 0.8 | 1.5 | 95 | 80 | Comparative Example |
| 3 | 0 | 1 | 1 | 2 | 10 | 5 | Comparative Example |
| 4 | 1 | 0.7 | 0.8 | 1.5 | 15 | 20 | Comparative Example |
| 5 | 2 | 0.7 | 0.8 | 1.5 | 7 | 5 | |
| 6 | 4 | 0.7 | 0.8 | 1.5 | 3 | 2 | |
| 7 | 8 | 0.7 | 0.8 | 1.5 | 5 | 2 | |
| 8 | 12 | 0.7 | 0.8 | 1.5 | 5 | 2 | |
| 9 | 20 | 0.7 | 0.8 | 1.5 | 5 | 2 | |
| 10 | 30 | 0.7 | 0.8 | 1.5 | 7 | 4 | |
| 11 | 35 | 0.7 | 0.8 | 1.5 | 25 | 35 | Comparative Example |
| 12 | 4 | 0.5 | 0.8 | 1.3 | 3 | 2 | |
| 13 | 4 | 0.5 | 0.5 | 1 | 4 | 1 | |
| 14 | 4 | 1 | 1 | 2 | 15 | 15 | Comparative Example |
| 15 | 4 | 0.9 | 0.9 | 1.8 | 3 | 2 | |
| 16 | Mo 4% | 0.7 | 0.8 | 1.5 | 3 | 2 | |
| 17 | W 4% | 0.7 | 0.8 | 1.5 | 3 | 2 | |

Test Nos. 1 to 3 are cases where chromium was not added. When the film thicknesses of the seed layer and the protective film were less than 1 nm, high percent defectives were marked both in the sulfuric acid dipping test and in the high-temperature and high-humidity environment test. Test Nos. 4 to 11 are cases where chromium was added, wherein the film thickness of the seed layer was 0.7 nm and the film thickness of the protective film was 0.8 nm. When the atomic % of chromium was 1%, high percentage defectives were marked both in the sulfuric acid dipping test and in the high-temperature and high-humidity environment test. The same applies to the case where the atomic % of chromium were 35%. It was confirmed that the preferable atomic % of chromium was 2% or more and 30% or less. A range of chromium atomic % that is 4% or more and 20% or less is particularly preferable. In test Nos. 12 to 15, the film thicknesses of the seed layer and the protective film were changed while the atomic % of chromium was fixed at 4%. Good results were obtained even in the cases where the seed layer was 0.5 nm thick (test Nos. 12 and 13). In particular, the total thickness of the seed layer and the protective film was as thin as 1 nm in the case where seed layer and the protective film each has a film thickness of 0.5 nm (test No. 13). While good results were obtained in the case where the seed layer and the protective film each had a film thickness of 0.9 nm (test No. 15), the percentage defective was worsened both in the sulfuric acid dipping test and in the high-temperature and high-humidity environment test in the case where the seed layer and the protective film each had a film thickness of 1.0 nm (test No. 14) for the above-described reason. Thus, the thickness of the protective film that ensured good results was 0.5 nm or more and 0.9 nm or less. Test Nos. 16 and 17, which are cases where molybdenum and tungsten was added, Thus, it was confirmed that a magnetic head slider that is capable of preventing corrosion and that has improved characteristics in high-temperature and high-humidity environment and that is capable of largely reducing the total thickness of the seed layer and the protective film can be realized by adding a predetermined amount of additive, such as chromium, to the seed layer and by setting the film thickness of the seed layer at less than 1 nm.

The seed layer to which the present invention is related, which mainly comprises silicon and contains chromium in a proportion of 2 atomic % or more and in a proportion of 30 atomic % or less is, also works well for improving the overwriting characteristics of a perpendicular magnetic recording type of write head element.

A write head element deteriorates in the overwriting characteristics which results from the head element and the recording medium corriding with each other during the recording medium operation. A comparison was made between Test Nos. 2 (Comparative Example) and 6 (Working Example) regarding the change in the overwriting characteristics which results from the head element and the recording medium corriding with each other. The change in the overwriting characteristics, shown as "Difference in OW characteristics" in Table 2, is defined as a decrement of the overwriting characteristics when the protective film (the DLC film) is ground by a thickness of 1 nm after the head element corrided with the recording medium repeatedly. A smaller difference in OW characteristics is more preferable. Referring to Table 2, the difference in OW characteristics is significantly decreased in Test No. 6 as compared to Test No. 2.

TABLE 2

| Test No. | Atomic Fraction of Cr (%) | Film Thickness of Base layer (nm) | Film Thickness of Protective layer (nm) | Total Thickness (nm) | MP (nm) | Difference in OW Characteristics (dB) | Notes |
|---|---|---|---|---|---|---|---|
| 2 | 0 | 0.7 | 0.8 | 1.5 | 1.6 | 2 | Comparative Example |
| 6 | 4 | 0.7 | 0.8 | 1.5 | 1.6 | 0.2 | |
| 18 | 4 | 0.7 | 0.8 | 1.5 | 0.6 | 0 | |

In a perpendicular magnetic recording type of write head element, main magnetic pole layer 36 and the magnetic shield layer 35 normally exhibit protruding lengths that are different from each other in the direction perpendicular to air bearing surface ABS. Thus, the magnetic pole layer that protrudes closer to air bearing surface ABS tends to more strongly (or more frequently) collide against the recording medium and tends to be more seriously damaged. The overwriting characteristics deteriorate partly because both magnetic pole layers are damaged in different degrees. In general, a larger difference in the protruding length (a difference in the positions of the tip portions of both magnetic pole layers measured in the direction perpendicular to air bearing surface ABS) leads to a larger difference in the damage that both magnetic pole layers suffer, easily causing deterioration of the overwriting characteristics. The difference in the protruding length is shown as "MP" in Table 2. However, Test Nos. 2 and 6 exhibit the same value of "MP", which means both Test Nos. 2 and 6 are the same in the geometric aspect of the magnetic pole layers.

The inventors think the reason why the difference in the overwriting characteristics is significantly decreased is as follows. The inventors found that the Raman spectroscopy analysis conducted in the DLC film formed on the seed layer that is made of Si and Cr shows that the peak at about 1550 $cm^{-1}$ (G-position) is shifted toward a higher frequency zone. This implies that the sp2 bonding decreases relatively to the sp3 bonding and that the DLC film is hardened. For this reason, Test No. 6 suffers less damage from the recording medium, which is transferred to the magnetic layer via the DLC film when the write head element corrides with the recording medium, although both cases have the same value of "MP", and as a result, the difference in the overwriting characteristics is significantly decreased.

Further, samples having smaller "MP" (Test No. 18) were formed under an IBE condition different from Test No. 6. Test Nos. 6 and 18 have the same composition and film thickness of the seed layer, but only differ in the value of "MP". Table 2 shows that the difference in the overwriting characteristics is further decreased in Test No. 18 and that the overwriting characteristics can be further improved by decreasing "MP", as well as by improving the DLC film itself.

While several preferable embodiments of the present invention have been described in detail, it is to be understood that various changes and modifications can be made without departing from the purport or the scope of the appended claims.

What is claimed is:

1. A magnetic head slider comprising:
   a slider body including either a write head element or a read head element or both the write head element and the read head element;
   a seed layer on an air bearing surface of the slider body, the seed layer covering either the write head element or the read head element or both the write head element and the read head element, the seed layer having a film thickness that is less than 1 nm; and
   a protective film comprising diamond-like carbon on the seed layer,
   wherein the seed layer is mainly comprising silicon and contains a 6B group element in a proportion of 2 atomic % or more and 30 atomic % or less.

2. The magnetic head slider according to claim 1, wherein the 6B group element comprises one or more elements selected from the group consisting of chromium, molybdenum and tungsten.

3. The magnetic head slider according to claim 2, wherein the film thickness of the seed layer is 0.5 nm or more and 0.9 nm or less.

4. The magnetic head slider according to claim 1, wherein the seed layer contains chromium in a proportion of 4 atomic % or more and 20 atomic % or less and has a film thickness that is 0.5 nm or more and 0.9 nm or less.

5. The magnetic head slider according to claim 1, wherein the film thickness of the protective film is 0.5 nm or more and 0.9 nm or less.

6. A head gimbal assembly comprising the magnetic head slider according to claim 1 and a suspension which elastically supports the magnetic head slider.

7. A hard disk drive comprising the magnetic head slider according to claim 1 and a device which supports the magnetic head slider and positions the magnetic head slider with respect to a recording medium.

* * * * *